United States Patent
Wilcken

(10) Patent No.: US 9,274,344 B2
(45) Date of Patent: Mar. 1, 2016

(54) METHOD FOR EXTRACTING OPTICAL ENERGY FROM AN OPTICAL BEAM

(71) Applicant: The Boeing Company, Chicago, IL (US)

(72) Inventor: Stephen K. Wilcken, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 13/942,561

(22) Filed: Jul. 15, 2013

(65) Prior Publication Data
US 2015/0015941 A1    Jan. 15, 2015

(51) Int. Cl.
| | |
|---|---|
| *G02B 27/10* | (2006.01) |
| *G02B 17/08* | (2006.01) |
| *G02B 23/06* | (2006.01) |
| *G02B 3/00* | (2006.01) |
| *G02B 23/04* | (2006.01) |
| *H04B 10/11* | (2013.01) |

(52) U.S. Cl.
CPC ............. *G02B 27/108* (2013.01); *G02B 3/00* (2013.01); *G02B 17/0804* (2013.01); *G02B 23/04* (2013.01); *G02B 23/06* (2013.01); *H04B 10/11* (2013.01)

(58) Field of Classification Search
CPC ........ G02B 23/00; G02B 23/02; G02B 23/04; G02B 23/06; G02B 23/10; G02B 23/12; G02B 23/105; G02B 13/12; G02B 17/00; G02B 17/08–17/0828; G02B 17/0836–17/0844; G02B 17/0864–17/0896; G02B 19/0028
USPC ......... 359/362, 364–366, 399, 419, 420, 421, 359/422, 850, 851, 855, 856, 857, 858, 859, 359/860, 864, 737, 741; 362/326–328, 331, 362/332; 398/118, 121, 122, 124, 125, 126, 398/127, 128, 129, 120, 131
See application file for complete search history.

(56) References Cited

U.S. PATENT DOCUMENTS

| | | | | |
|---|---|---|---|---|
| 6,462,846 | B1 * | 10/2002 | DeLong | ........................ 398/135 |
| 7,842,909 | B2 | 11/2010 | Dunne et al. | |
| 8,107,168 | B2 | 1/2012 | Murnan et al. | |
| 2002/0171896 | A1 * | 11/2002 | Clark et al. | ................... 359/172 |

FOREIGN PATENT DOCUMENTS

| | | |
|---|---|---|
| EP | 0 886 160 A2 | 12/1998 |
| EP | 0 977 070 A1 | 2/2000 |
| EP | 2 387 167 A1 | 11/2011 |
| GB | 2 481 705 A | 1/2012 |
| WO | WO 02 073835 A1 | 9/2002 |

OTHER PUBLICATIONS

Lightpath, "2006 Product Catalog".*
International Search Report and Written Opinion for Application No. PCT/US2014/035723, dated Sep. 5, 2014; Applicant's File Reference No. 12-1637-PCT, 10 pages.

* cited by examiner

*Primary Examiner* — Bumsuk Won
*Assistant Examiner* — Wen Huang
(74) *Attorney, Agent, or Firm* — Toler Law Group, PC

(57) ABSTRACT

A method includes generating a primary beam using light emitted by a light-source. The method includes generating a secondary beam using a portion of the light using a lens of a telescope. The lens includes one or more refraction elements positioned on a first surface of the lens, and the secondary beam is generated by diverting the portion of the light using the one or more refraction elements.

20 Claims, 5 Drawing Sheets

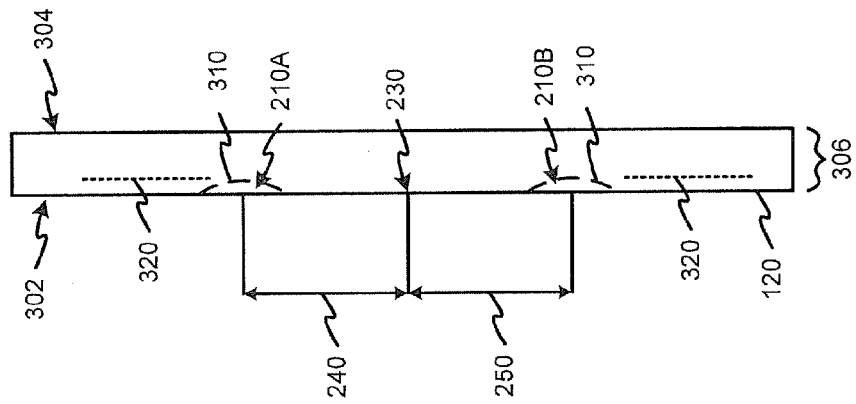
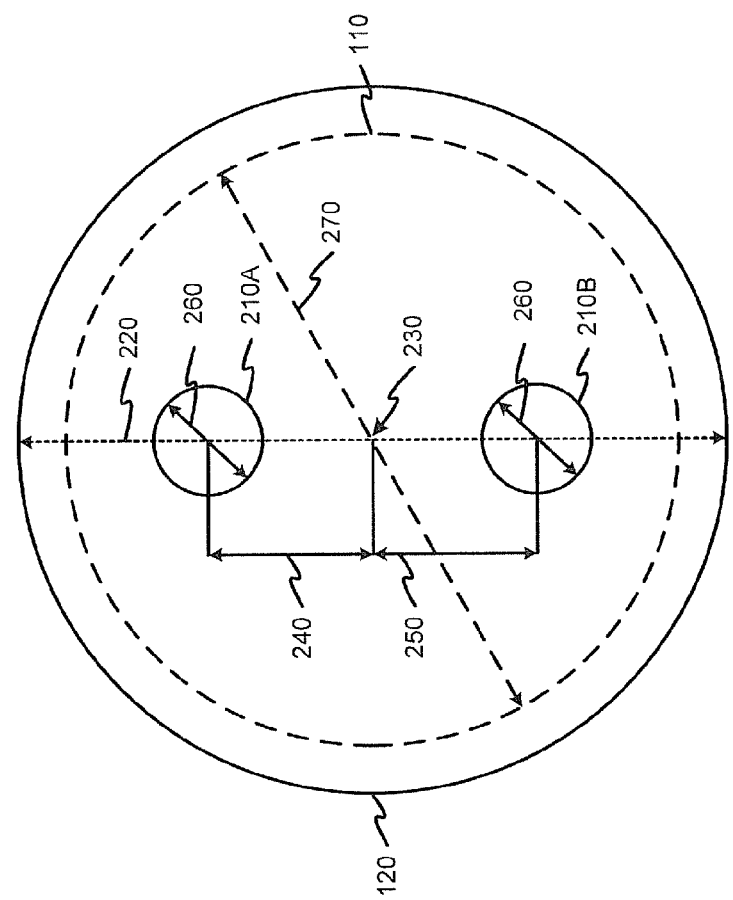

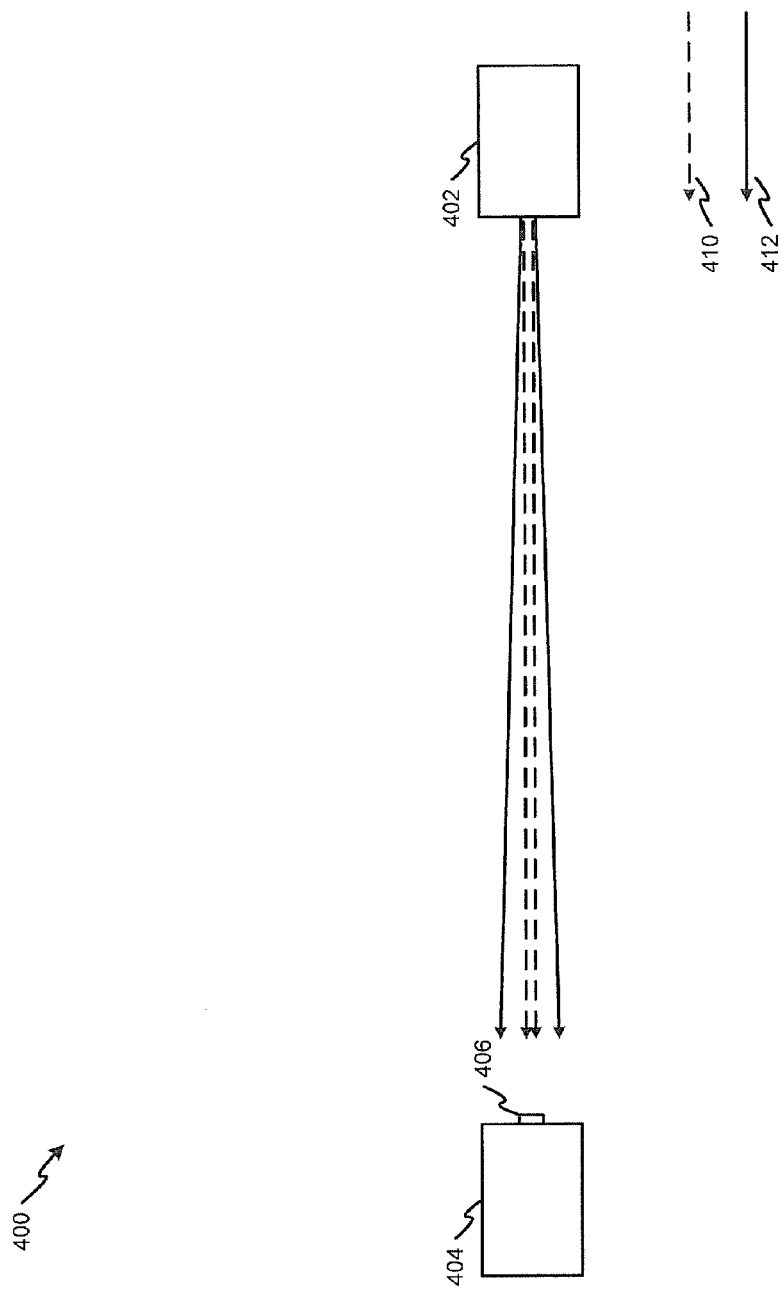

METHOD FOR EXTRACTING OPTICAL ENERGY FROM AN OPTICAL BEAM

FIELD OF THE DISCLOSURE

The present disclosure is generally related to optical communication systems including a lens configured to generate a beacon beam for use in optical communications.

BACKGROUND

Optical communication systems, such as laser communication systems, may use a directed beam of light to communicate data over great distances (e.g., many miles) through free space (e.g., through the air or space). The beam of light may be generated by a first device (e.g., a first laser communication terminal) and may be received at a second device (e.g., another laser communication terminal) that is located remote of the first device. The first device and the second device may use the beam of light to establish two way communications for transmitting and receiving data. The second device may have difficulty locating the beam of light because the beam of light may have a narrow angular divergence. To increase the second device's ability to detect the beam of light, the first device may generate a beacon beam. Optical energy (i.e., light) for the beacon beam may be produced by: (1) a dedicated beacon optical source (e.g., a beacon beam light source) located adjacent to a main optical energy source (e.g., a laser); or (2) a portion of the optical energy produced by the main optical energy source (e.g., the laser) may be extracted for use in producing the beacon beam. In the second instance, a mechanical mount or bracket may position a lens within the path of the beam of light (e.g., light produced by the main optical energy source) to divert a portion of the beam of light. The mechanical mount or bracket may block a portion of the beam of light from being transmitted from the first device to the second device. The blocked portion of the beam of light reduces intensity of the beam of light.

SUMMARY

A laser communication terminal may include a lens configured to generate a beacon beam for use in establishing communication with a second laser communication terminal. The lens includes one or more refraction elements positioned on a surface of the lens. The one or more refraction elements are configured to generate the beacon beam by diverting a portion of light emitted from a light-source of the laser communication terminal. The lens may be a substantially clear plate (e.g., an optical glass plate or a polymer plate). The laser communication terminal may also be configured to generate a primary beam for use in communicating with a remote laser communication terminal. The one or more refraction elements may be configured to divert a portion of the light used to generate the primary beam to generate the beacon beam. Because the one or more refraction elements are held in the path of the light by the substantially clear lens, the loss of light associated with mechanical mounts and brackets may be eliminated. Additionally, a laser communication terminal including a lens described in one or more of the embodiments disclosed herein may be capable of achieving a desired beam intensity and/or a communication data rate at a reduced transmission power when compared to laser communication terminals that use the mechanical mounts or brackets.

In a particular embodiment, an apparatus includes a light-source, a primary mirror, a secondary mirror, and a lens. The light-source may be configured to emit light having a Gaussian intensity profile, such as a laser beam. The primary mirror and the secondary mirror may form a Cassegrain optical system. The lens includes two refraction elements positioned on a first surface of the lens. The two refraction elements may be positioned approximately equidistant from a center of the first surface of the lens. The primary mirror and the secondary mirror may be configured to generate a primary beam using light emitted from the light-source. The lens is positioned between the light-source and the primary mirror, and the two refraction elements may be configured to generate a beacon beam using at least a portion of the light emitted from the light-source. The beacon beam may include two respective beacon beams that overlap and/or converge in a uniform and balanced manner in the far-field. A first respective beacon beam may generated by a first refraction element and a second respective beacon beam may be generated by a second refraction element.

In another embodiment, a laser communication terminal includes a first lens, a second lens, and a light-source. The first lens may be an objective lens and the first lens and the light-source may be arranged to form a refractive optical system with no central obstruction (e.g., a refractive telescope). The second lens includes a centrally located refraction element configured to generate a beacon beam and may be positioned between the light-source and the first lens. The centrally located refraction element may be centered on an optical axis of the laser communication terminal. The first lens of the laser communication terminal may be configured to generate a primary beam using light emitted from the light-source, and the centrally located refraction element of the second lens may be configured to generate a single beacon beam using at least a portion of the light emitted from the light-source.

In an embodiment, a lens has a first surface and a second surface, where the first surface may be separated from the second surface by a thickness of the lens. The first surface of the lens may include a first refraction element and a second refraction element. The first refraction element and the second refraction element may be positioned approximately equidistant from a center of the first surface of the lens. When the lens is incorporated into a telescope, the first refraction element and the second refraction element may be configured to generate a beacon beam when light emitted from a light-source of the telescope passes through the lens. The beacon beam may include two respective beacon beams that overlap and/or converge in a uniform and balanced manner in the far-field. A first respective beacon beam may generated by a first refraction element, and a second respective beacon beam may be generated by a second refraction element.

In another embodiment, a method includes generating a primary beam using light emitted by a light-source. The primary beam may be generated by reflecting the light using a primary mirror and a secondary mirror of a telescope, as in a typical Cassegrain optical arrangement, or the primary beam may be generated by an objective lens, as in a typical refraction optical arrangement. The method includes generating a secondary beam (e.g., a beacon beam) using a portion of the light using a lens of the telescope. In an optical system with a central obstruction (e.g., telescopes arranged according to a Cassegrain optical arrangement), the lens includes two or more refraction elements positioned approximately equidistant from a center of a first surface of the lens, and the secondary beam is generated by diverting the portion of the light using the two or more refraction elements. In an optical system that does not include a central obstruction (e.g., telescopes arranged according to a refracting optical arrangement), the lens includes a centrally located refraction element positioned on a surface of the lens, and the secondary beam is generated by diverting the portion of the light using the centrally located refraction element.

BRIEF DESCRIPTION OF THE DRAWINGS

FIG. 2 is a illustrative embodiment of a lens configured to generate a beacon beam;

FIG. 3 is a profile view of a lens configured to generate a beacon beam;

FIG. 4 is an illustrative embodiment of a laser communication system ;

DETAILED DESCRIPTION

Figure 1:
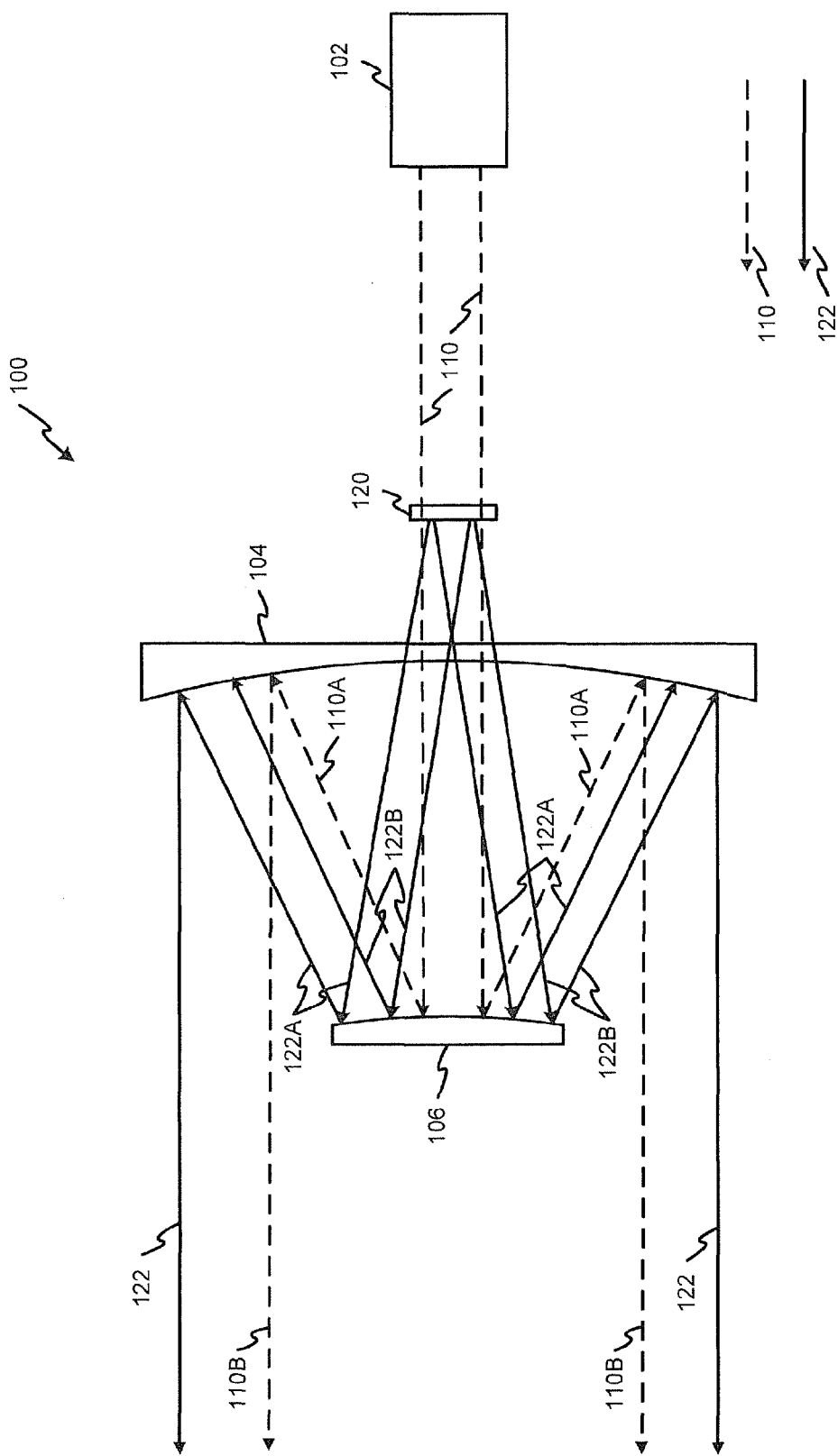
FIG. 1 is a block diagram of an illustrative embodiment of a laser communication terminal configured to generate a primary beam and a beacon beam.

Referring to FIG. 1, a block diagram of an illustrative embodiment of a laser communication terminal 100 configured to generate a primary beam and a secondary beam (a beacon beam) is shown. The laser communication terminal 100 includes a light-source 102, a primary mirror 104, a secondary mirror 106, and a lens 120. In an embodiment, the light-source 102 may be external to and distinct from the laser communication terminal 100. In an embodiment, the light-source 102 may be a laser and/or may include other components (e.g., prisms, mirrors, etc.).

The primary mirror 104 and the secondary mirror 106 may be configured to generate a primary beam 110B using light 110 emitted from the light-source 102. To illustrate, the light-source 102 may be configured to emit the light 110 such that the light 110 is directed towards the secondary mirror 106. In an embodiment, the primary mirror 104 and the secondary mirror 106 may form a Cassegrain optical system. The primary mirror 104 may include a central aperture (not shown in FIG. 1) configured to enable the light 110 to pass through the primary mirror 104 to the secondary mirror 106 unobstructed. The secondary mirror 106 may be configured to reflect most of the light 110 towards the primary mirror 104 as light 110A. The primary mirror 104 may be configured to reflect the light 110A as a primary beam 110B.

In an embodiment, the laser communication terminal 100 may operate as part of a laser communication system and may transmit data to a remote laser communication terminal (not shown in FIG. 1) via the primary beam 110B. For example, data may be encoded within the primary beam 110B (e.g., using amplitude modulation, frequency modulation, pulse width modulation, etc.). In an embodiment, the primary beam 110B is a substantially collimated beam. The primary beam 110B may be transmitted from the laser communication terminal 100 to the remote laser communication terminal through open space (e.g., air, space, etc.) and over long distances (e.g., distances that may exceed one (1) mile). In a particular embodiment, the laser communication terminal 100 may be a first telescope and the remote laser communication terminal (not shown in FIG. 1) may be a second telescope. The first telescope and the second telescope may correspond to instruments that collect, transmit, and receive electromagnetic radiation and aid in observation.

Detecting the primary beam 110B at the remote laser communication terminal may be difficult due to a small angular divergence of the primary beam 110B from the laser communication terminal 100, and due to lack of precise a priori knowledge of where to aim the primary beam 110B from the laser communication terminal 100 such that the primary beam 110B is intercepted or received at a receiving aperture of the remote laser communication terminal. For example, the primary beam 110B may have an angular divergence of approximately one (1) to two (2) arc seconds. To enhance the visibility of the primary beam 110B at the remote laser communication terminal and to increase the speed at which the remote laser communication terminal is able to locate and to begin receiving data via the primary beam 110B, the laser communication terminal 100 may generate a beacon beam 122 using the lens 120. The beacon beam 122 may facilitate locating the primary beam 110B by the remote laser communication terminal. As described above, the primary beam 110B generated by the laser communication terminal 100 may have a small angular divergence (e.g., one (1) to two (2) arc seconds) which may be difficult to locate or detect when the remote laser communication terminal is located many miles from the laser communication terminal 100. Conversely, the beacon beam 122 generated by the laser communication terminal 100 may have a moderately large angular divergence (e.g., a few tenths of a degree). For example, a diameter of the beacon beam 122 may be greater than the diameter of the primary beam 110B in the far field (i.e., at the location of the remote laser communication terminal). The diameter of the beacon beam 122 in the far field may be sufficiently large to encompass the receiving aperture of the remote laser communication terminal. The laser communication terminal 100 will thus be visible to the remote terminal as an "artificial star," and thus provide an optical signal for the remote laser communication terminal to engage or "lock on" to for continuous tracking purposes. If two-way communication is contemplated, a similar structural arrangement may be implemented at the remote laser communication terminal, thus providing an "artificial star" for the laser communication terminal 100 to "lock on" to. For example, the remote laser communication terminal may include a lens, a primary mirror, and a secondary mirror arranged in a manner similar to the arrangement of the lens 120, the primary mirror 104, and the second mirror 106 of the laser communication terminal 100. In a particular embodiment, the beacon beam 122, the primary beam 110B, or both may have a non-circular cross-section in the far field. In this embodiment, a characteristic length of the cross-section of the beacon beam 122 may be larger than a corresponding characteristic length of the cross-section of the primary beam 110B.

In an embodiment, the surfaces of the lens 120 may be substantially flat (e.g., planar or within a desired machining tolerance). In an embodiment, the lens 120 may be made from a material that is transparent to a wavelength of the primary beam 110B (e.g., the lens 120 may be substantially optically neutral). The lens 120 may include one or more refraction elements. For example, the one or more refraction elements may be positioned on a first surface of the lens 120, on a second surface of the lens 120, within the lens 120, or on the first surface and a second surface of the lens 120. When the lens includes two or more refraction elements, the two or more refraction elements may be positioned approximately equidistant from a center of the first surface of the lens. When the lens includes one refraction element (i.e., when the lens is incorporated into a telescope that does not include a central obstruction), the one refraction element may be positioned centered The one or more refraction elements may be configured to generate the beacon beam 122 using at least a portion of the light 110 emitted by the light-source 102. In an embodiment, when the lens 120 includes two or more refraction elements, a first refraction element of the two or more refraction elements may divert a first portion 122A of the light 110 and a second refraction element of the two or more refraction elements may divert a second portion 122B of the light 110, and so on for additional refraction elements. The beacon beam 122 may include all or some of light corresponding to the first portion 122A and the second portion 122B, and so on for additional refraction elements. In an embodiment, the first portion 122A may form a first beacon beam and the second portion 122B may form a second beacon beam. The first beacon beam and the second beacon beam may appear as a single beacon beam (e.g., the beacon beam 122) when viewed in the far field. In an embodiment, the lens 120 may be positioned between the light-source 102 and the primary mirror 104, as shown in FIG. 1. In another embodiment, the lens 120 may be positioned within the central aperture of the primary mirror 104 or another location suitable for creating the beacon beam 122A.

In an embodiment, the one or more refraction elements of the lens 120 may be configured to generate the beacon beam 122 by diverting the portion of the light 110 into a relatively large angle such that some of the diverted portion of the light 110 bypasses (e.g., is not reflected by) the secondary mirror 106. Those skilled in the art will recognize that this may give rise to a discontinuity in the far-field optical radiation pattern of the beacon beam 122. The discontinuity in the far-field optical radiation pattern of the beacon beam 122 may not be suitable for a particular application of the laser communication terminal 100. Thus, in another embodiment, the one or more refraction elements of the lens 120 may be configured to generate the beacon beam 122 by diverting the portion of the light 110 into a less strongly diverging beacon beam 122, such that beacon beam 122 intercepts, and is reflected by, both the secondary mirror 106 and the primary mirror 104. In this embodiment, the beacon beam 122 can be considered as a slightly out-of-focus portion of the primary beam 110B produced by laser communication terminal 100. This embodiment may eliminate the discontinuity in the far-field optical radiation pattern of the beacon beam 122. In particular, one or more off-axis beacon beams may be generated by the refraction elements of lens 120, which will in turn reflect from respective off-axis portions of the primary mirror 104 and the secondary mirror 106, such that the secondary mirror 106 will not obscure the one or more beacon beams as they exit the laser communications terminal 100. Thus, the far-field radiation pattern will have no discontinuity. The optical power of the one or more refraction elements of lens 120 may be adjusted within a limited range such that a desired angle of divergence of the beacon beam 122 is achieved, while avoiding obscuration by the secondary mirror.

As shown in FIG. 1, the beacon beam 122 may have a diameter (or characteristic length of the cross-section of the beacon beam 122) that is greater than the diameter (or characteristic length of the cross-section) of the primary beam 110B. Because the lens 120 includes a substantially clear plate (e.g., an optical glass plate or a polymer plate), an amount of the light 110 that is lost as the light 110 passes through the lens 120 may be reduced. For example, laser communication terminals that use mechanical mounts, such as opaque brackets or rings, to position refraction elements within the path of the light 110 may block over ten percent (10%) of the light 110. This may reduce an intensity and a data communication rate of a primary beam transmitted by a laser communication terminal, which may be compensated for by increasing an amount of transmission power of the laser communication terminal. In most cases, a compensating increase in the laser communication terminal transmission power to accommodate losses of this type may not be an option, thus jeopardizing achievable data rate and/or communication range. In contrast, the lens 120 is a substantially clear plate (e.g., a clear glass or polymer plate) that includes a high-efficiency anti-reflection coating on the major faces, and thus enables substantially all of the light 110 to pass through the lens 120. Thus, the lens 120 may reduce an amount of transmission power required for the laser communication terminal 100 to transmit the primary beam 110B at a desired intensity and/or achieve a desired data communication rate when compared to the laser communication terminals that use the mechanically mounted refraction elements or lenses.

Referring to FIG. 2, an illustrative embodiment of the lens 120 of FIG. 1 is shown. As shown in FIG. 2, the lens 120 includes a first refraction element 210A and a second refraction element 210B (collectively referred to as the two or more refraction elements 210). In an embodiment, the two or more refraction elements 210 may have a substantially circular shape having a diameter 260. In an embodiment, the diameter 260 is approximately 3.6 millimeters. In a particular embodiment, the two or more refraction elements 210 may correspond to concave portions of a first surface of the lens 120. In another particular embodiment, the two or more refraction elements 210 may correspond to convex portions of the first surface of the lens 120. In another particular embodiment, the two or more refraction elements 210 may correspond to beveled portions of the first surface of the lens 120. In another particular embodiment, the two or more refraction elements 210 may correspond to portions of the lens 120 having a refractive index that is different than a remaining portion of the lens 120. For example, the lens 120 may be an optical glass plate having a first refractive index, and the portions of the lens 120 that define the two or more refraction elements 210 may have a second refractive index that is different than the first refractive index.

As shown in FIG. 2, the first refraction element 210A may be positioned along a diameter 220 of the first surface of the lens at a first distance 240 and the second refraction element 210B may be positioned along the diameter 220 at a second distance 250 from the center 230. In an embodiment, the first distance 240 and the second distance 250 may be equal. For example, the first distance 240 and the second distance 250 may be approximately 5.24 millimeters from the center 230. Thus, a center of each of the two or more refraction elements 210 may be positioned approximately 5.24 millimeters from the center 230. In an embodiment, the diameter 220 is greater than a diameter 270 of the beam of light 110. For example, when the diameter 270 of the beam of light 110 is two-thirds (⅔) of an inch, the diameter 220 of the lens 120 may be approximately 25 millimeters. In an embodiment, the first distance 240 and the second distance 250 are equal or approximately equal, and the first refraction element 210A the second refraction element 210B are positioned equidistant or approximately equidistant from the center 230 of the first surface of the lens 120.

In another embodiment, the first refraction element 210A and the second refraction element 210B may not be positioned equidistant from the center 230 of the lens 120. For example, the first distance 240 may be greater than or smaller than the second distance 240. In yet another embodiment, the refraction elements 210 may positioned equidistant or substantially equidistant from the center 230 of the lens 120, and other refraction elements (not shown in FIG. 2) may be positioned on the first surface of the lens 120. In another embodiment, the lens 120 may include more than two refraction elements positioned symmetrically about the center 230 of the lens 120. For example, the more than two refraction elements may be arranged symmetrically about the center 230 in a triangle pattern, in a square pattern, or another pattern configured to generate a desired characteristic of the beacon beam. When the refraction elements are arranged symmetrically about the center 230 of the lens 120, the beacon beam 122 may have a substantially symmetric intensity profile, as described with reference to FIG. 5, where the laser communication terminal conducts or conveys a laser beam having a Gaussian profile. As the number of refraction elements included in the lens 120 increases, more of the light 110 may be diverted, making a stronger beacon beam which may reduce the intensity of the primary beam.

Referring to FIG. 3, a profile view of the lens 120 of FIGS. 1 and 2 is shown. As shown in FIG. 3, the lens 120 has a first surface 302 and a second surface 304. The first surface 302 and the second surface 304 of the lens 120 may be separated by a thickness 306. In a particular embodiment, the thickness 306 of the lens 120 may be approximately 2.0 millimeters.

The lens 120 includes the first refraction element 210A and the second refraction element 210B of FIG. 2. As described with reference to FIG. 2, the first refraction element 210A may be positioned on the first surface 302 at the first distance 240 relative to the center 230, and the second refraction element 210B may be positioned at the second distance 250 relative to the center 230. In an embodiment, the first surface 302 is a substantially flat surface exclusive of a first area (corresponding to the first refraction element 210A) and a second area (corresponding to the second refraction element 210B). In an embodiment, the second surface is a substantially flat surface. In an embodiment, the refraction elements 210 may be positioned on the second surface 304. In this embodiment, the first surface 302 may be a substantially flat surface, and the second surface 304 may be a substantially flat surface exclusive of a first area (corresponding to the first refraction element 210A) and a second area (corresponding to the second refraction element 210B). In another embodiment, refraction elements may be positioned on both the first surface 302 and the second surface 304 of the lens 120.

In an embodiment, the first refraction element 210A and the second refraction element 210B may have a concave shape relative to the first surface 302 of the lens 120. The concave shape of each of the refraction elements 210 may extend a depth 320 into the thickness 306 of the lens 120 and may have a diameter (e.g., the diameter 260 of FIG. 2) and a radius of curvature 310. In an embodiment, the diameter 260 may be approximately 3.6 millimeters, the radius of curvature 310 may be approximately 51.68 millimeters, and the depth 310 may be approximately 0.03 millimeters. In an alternative embodiment, the first refraction element 210A and the second refraction element 210B may have a convex shape relative to the first surface 302 of the lens 120. When the refraction elements 210 have the convex shape, the refraction elements 210 may extend away from the surface 302 of the lens 120. In another particular embodiment, the lens 120 may include one or more refraction elements having a concave shape relative to one or more surfaces of the lens 120 and one or more additional refraction elements having a convex shape relative to the one or more surfaces of the lens 120. In yet another embodiment, the lens 120 may include refraction elements that are disposed entirely within the thickness 306 of the lens 120, and the first surface 302 and the second surface 304 may be substantially flat surfaces.

The first surface 302 (including the refraction elements 210) and the second surface 304 of the lens 120 may be coated with an anti-reflective coating. In an embodiment, the anti-reflective coating may include an anti-reflective coating having a "V-shaped" anti-reflective profile that provides less than one percent (<1%) reflectance per surface (e.g., the first surface 302 or the second surface 304) including the refraction elements 210 at wavelengths between one-thousand five-hundred and thirty (1530) to one-thousand five-hundred and sixty (1560) nanometers (nm). In a particular embodiment, the first surface 302 and the second surface 304 of the lens 120 may be highly polished. For example, the lens 120 may be polished to the equivalent of a twenty (20)/ten (10) scratch-dig level of quality. In an embodiment, the edges of the lens 120 may be unpolished and fine ground to a four-hundred (400) mesh equivalent. In an embodiment, the lens 120 may have a transmitted wavefront error through the surfaces 302, 304 of less than one-quarter (<0.25) of a wavelength (e.g., peak to valley) at six-hundred and thirty three (633) nanometers.

Referring to FIG. 4, an illustrative embodiment of a laser communication system 400 is shown. As shown in FIG. 4, the laser communication system 400 includes a first laser communication terminal 402 and a second laser communication terminal 404. The first laser communication terminal 402 may be configured to generate a primary beam 410 and a secondary beam 412 (e.g., a beacon beam). In a particular embodiment, the first laser communication terminal 402 may be the laser communication terminal 100 of FIG. 1. In this embodiment, the primary beam 410 may be the primary beam 110B of FIG. 1 and the secondary beam 412 may be the beacon beam 122 of FIG. 1.

The second laser communication terminal 404 may include an optical element 406 configured to facilitate detection of the primary beam 410. For example, the second laser communication terminal 404 may detect the primary beam 410 by first detecting the secondary beam 412. Once the second laser communication terminal 404 has detected the secondary beam 412, the second laser communication terminal 404 may then align the optical element 406 with the primary beam 410 and begin receiving data from the first laser communication terminal 402 via the primary beam 410.

Figure 5:
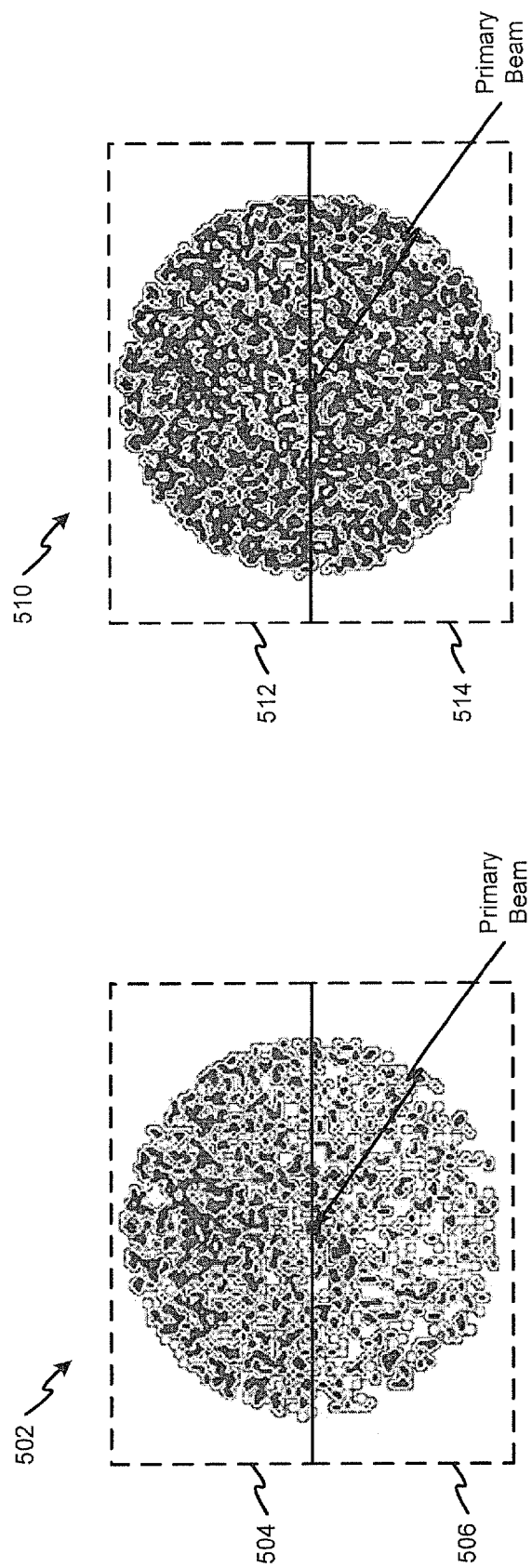
FIG. 5 includes illustrative examples of light intensity profiles associated with a primary beam and a secondary beam.

Referring to FIG. 5, illustrative examples of the far-field light intensity distribution associated with a primary beam and a secondary beam (e.g., a beacon beam) are shown by means of spot diagrams 502 and 510, where far-field optical intensity is represented both by spot density and by color coding. The far-field representation of the primary beam (e.g., the primary beam 110 of FIG. 1) is indicated by the unresolved spot at the center of the spot diagrams 502 and 510. The secondary beam (e.g., a beacon beam) is represented by the large, defocused blur in the spot diagrams 502 and 510. The spot diagrams 502 and 510 were generated with a ray trace program by launching a collimated ray bundle with a radial Gaussian intensity distribution into a representative Cassegrain optical system, such as the laser communication terminal 100 of FIG. 1. The incident primary beam (e.g., the primary beam 110 of FIG. 1) is assumed to exhibit a non-uniform (e.g., Gaussian) radial intensity distribution as it enters the Cassegrain optical system. The incident primary beam retains its non-uniform radial intensity distribution as it propagates throughout optical system.

In FIG. 5, the spot diagram 502 is produced using a lens that includes a single refraction element positioned off-center relative to a center of a first surface of the lens. The refraction element may also be off-center relative to the non-uniform primary beam. The single off-axis refraction element will produce a diverging (conical) secondary beam outlined as 122A in FIG. 1. As a result of the off-axis placement of the single refraction element, the secondary beam profile in the far field will exhibit an asymmetric intensity distribution which replicates a respective portion of the asymmetric intensity distribution of the primary beam 110 of FIG. 1, as was intercepted by the off axis refraction element. This result is demonstrated by the unequal spot densities in the segments 504 and 506 of spot diagram 502.

By way of contrast, in FIG. 5, the spot diagram 510 is produced by two refraction elements positioned symmetrically about a center of the first surface of the lens. The two off-axis refraction elements produce separate diverging secondary beams outlined as 122A and 122B in FIG. 1. The asymmetric far-field radial intensity distribution produced by the first refraction element may be overlaid in the far-field by an equal but inverse radial intensity distribution produced by the second refraction element, thereby creating a uniform intensity distribution in the far field, as demonstrated by the equivalent spot densities in the segments 512 and 514 of the spot diagram 510.

Figure 6:
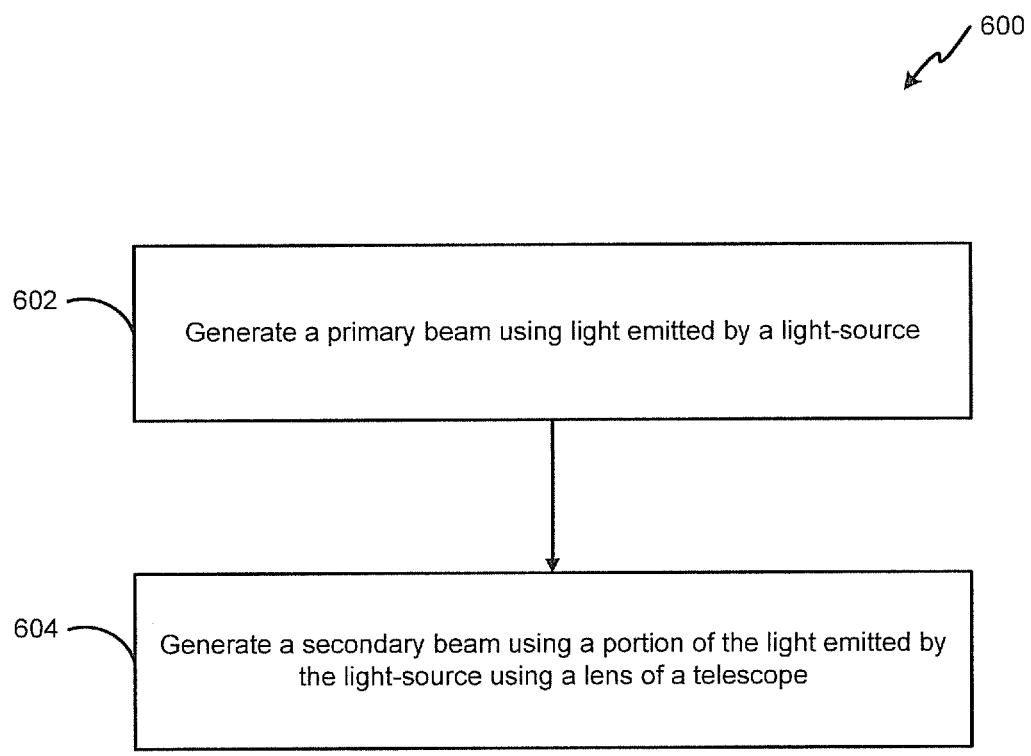
FIG. 6 is a flowchart of an embodiment of a method of generating a primary beam and a secondary beam.

Referring to FIG. 6, a flowchart of an embodiment of a method of generating a primary beam and a secondary beam (e.g., a beacon beam) is shown and designated 600. In an embodiment, the method 600 may be performed by the laser communication terminal 100 of FIG. 1. For example, the laser communication terminal 100 may use the light-source 102, the primary mirror 104, and the secondary mirror 106 to generate the primary beam, and may use the lens 120 to generate the secondary beam (e.g., the beacon beam 122 of FIG. 1).

The method 600 includes, at 602, generating a primary beam using light emitted by a light-source. The primary beam (e.g., the primary beam 110B of FIG. 1) may be generated by reflecting the light using a primary mirror (e.g., the primary mirror 104 of FIG. 1) and a secondary mirror (e.g., the secondary mirror 106 of FIG. 1) of a typical Cassegrain type telescope (e.g., the laser communication terminal 100 of FIG. 1). The method includes, at 604, generating a secondary beam (e.g., the beacon beam 122 of FIG. 1) using a portion of the light (e.g., the light 110 of FIG. 1) using a lens (e.g., the lens 120 of FIG. 1) of the telescope. For a typical reflective type optical system, such as the laser communication terminal 100 of FIG. 1, the lens (e.g., the lens 120 of FIG. 1) may include two or more off-axis refracting elements (e.g., the refraction elements 210 of FIG. 2) positioned approximately equidistant from a center of a first surface of the lens. The secondary beam may be generated by diverting the portion of the light using the two or more refracting elements as described with reference to FIG. 1. For example, light of the secondary beam may be diverted by the two or more refracting elements into a small angle. The diverging secondary beam reflects from respective off-axis portions of both the primary mirror and the secondary mirror of the telescope, thus giving rise to a change in the degree of collimation (i.e., focus) of a portion of the primary beam, while avoiding obscurations of the secondary beam by the secondary mirror of the telescope. The defocused secondary beam portion of the primary beam may be used as the beacon beam (e.g., the beacon beam 122 of FIG. 1).

Thus, a telescope operable to perform the method 600 is configured to generate a primary beam by reflecting light from a light-source using a primary mirror and a secondary mirror and to generate a secondary beam using a lens, such as the lens 120 of FIGS. 1-3. The telescope, when performing the method 600, may use a reduced amount of transmission power to generate the primary beam when the secondary beam is generated using the lens because the lens diverts a portion of the light to generate the secondary beam while allowing the remaining light to be used to generate the primary beam.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. For example, many of the embodiments herein describe the lens 120 as being incorporated within a reflective type optical telescope having a Cassegrain configuration (e.g., a primary mirror and a secondary mirror). However, the lens 120 of FIGS. 1 and 2 may be used in conjunction with other laser communication terminals having different configurations (e.g., a refracting type telescope that does not include a central obstruction). Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An apparatus comprising:
   a primary mirror;
   a secondary mirror; and
   a lens comprising a refraction portion surrounded by a substantially planar portion, wherein the substantially planar portion, the primary mirror, and the secondary mirror are arranged to generate a primary beam using a first portion of light emitted from a light-source, and wherein the refraction portion is arranged to generate a beacon beam using a second portion of the light emitted from the light-source.

2. The apparatus of claim 1, wherein the apparatus comprises a first telescope configured to communicate data to a second telescope via the primary beam.

3. The apparatus of claim 2, wherein first telescope is located at a first location, and wherein the second telescope is located at a second location that is remote of the first location.

4. The apparatus of claim 2, wherein the second telescope is configured to locate the first telescope based at least in part on the beacon beam.

5. The apparatus of claim 1, wherein the lens comprises a second refraction portion surrounded by the substantially planar portion, and wherein both the refraction portion and the second refraction portion have a concave shape relative to the substantially planar portion.

6. The apparatus of claim 5, wherein the concave shape of the refraction portion extends into a thickness of the lens.

7. The apparatus of claim 1, wherein the lens comprises a second refraction portion surrounded by the substantially planar portion, and wherein both the refraction portion and the second refraction portion have a convex shape relative to the substantially planar portion.

8. The apparatus of claim 7, wherein the convex shape of the refraction portion extends away from the substantially planar portion.

9. The apparatus of claim 1, wherein the primary beam has a first diameter, wherein the beacon beam has a second diameter that is greater than the first diameter in a far field.

10. The apparatus of claim 1, wherein the lens is coated with an anti-reflective coating.

11. The apparatus of claim 1, wherein the light-source includes a laser.

12. The apparatus of claim 1, wherein the lens comprises:
a first surface that is substantially planar; and
a second surface, wherein the first surface is separated from the second surface by a thickness, wherein the second surface includes the refraction portion and the substantially planar portion.

13. The apparatus of claim 12, wherein the refraction portion is configured to generate a portion of the beacon beam when light emitted from a light-source passes through the lens, wherein the second surface includes a second refraction portion, wherein the second refraction portion is configured to generate a second portion of the beacon beam when light emitted from the light-source passes through the lens.

14. The apparatus of claim 13, wherein the refraction portion and the second refraction portion have a concave shape relative to the second surface, and wherein the second surface is substantially flat exclusive of the refraction portion and the second refraction portion.

15. The apparatus of claim 13, wherein the refraction portion and the second refraction portion have a convex shape relative to the second surface, and wherein the second surface is substantially flat exclusive of the refraction portion and the second refraction portion.

16. The apparatus of claim 12, wherein the first surface and the second surface of the lens are coated with an anti-reflective coating.

17. A method comprising:
generating a primary beam using a first portion of light emitted by a light-source using a primary mirror, a secondary mirror, and a substantially planar portion of a lens of a telescope; and
generating a beacon beam by diverting a second portion of the light using a refraction portion of the lens that is surrounded by the substantially planar portion.

18. The method of claim 17, wherein the primary beam is generated by reflecting the light using the primary mirror and the secondary mirror of the telescope, and wherein the lens is coated with an anti-reflective coating.

19. The apparatus of claim 5, wherein a first refraction center of the refraction portion is a distance away from a lens center of the lens, wherein a second refraction center of the second refraction portion is the distance away from the lens center.

20. The apparatus of claim 1, wherein the light emitted by the light source has a first diameter when incident on the lens, and wherein the lens has a second diameter that is larger than the first diameter.

* * * * *